VOLTAGE SURGE DIVERTER

Original Filed Sept. 16, 1968 2 Sheets-Sheet 1

Inventors,
James S. Kresge,
Stanley H. Miske, Jr.,
by Vale P. Myles
Their Attorney.

Inventors,
James S. Kresge,
Stanley H. Miske, Jr.,
by Vale P. Myles
Their Attorney.

United States Patent Office

Re. 27,344
Reissued Apr. 25, 1972

27,344
VOLTAGE SURGE DIVERTER

James S. Kresge and Stanley A. Miske, Jr., Pittsfield, Mass., assignors to General Electric Company Original No. 3,538,388, dated Nov. 3, 1970, Ser. No. 762,265, Sept. 16, 1968. Application for reissue Jan. 18, 1971, Ser. No. 107,600
Int. Cl. H02h *3/22, 7/24, 9/06*
U.S. Cl. 317—68 5 Claims

Matter enclosed in heavy brackets [ ] appears in the original patent but forms no part of this reissue specification; matter printed in italics indicates the additions made by reissue.

ABSTRACT OF THE DISCLOSURE

A valve type current limiting gap lightning arrester having extra series valve resistance shunted by inductance to control the discharge voltage of the arrester.

Figure 1:
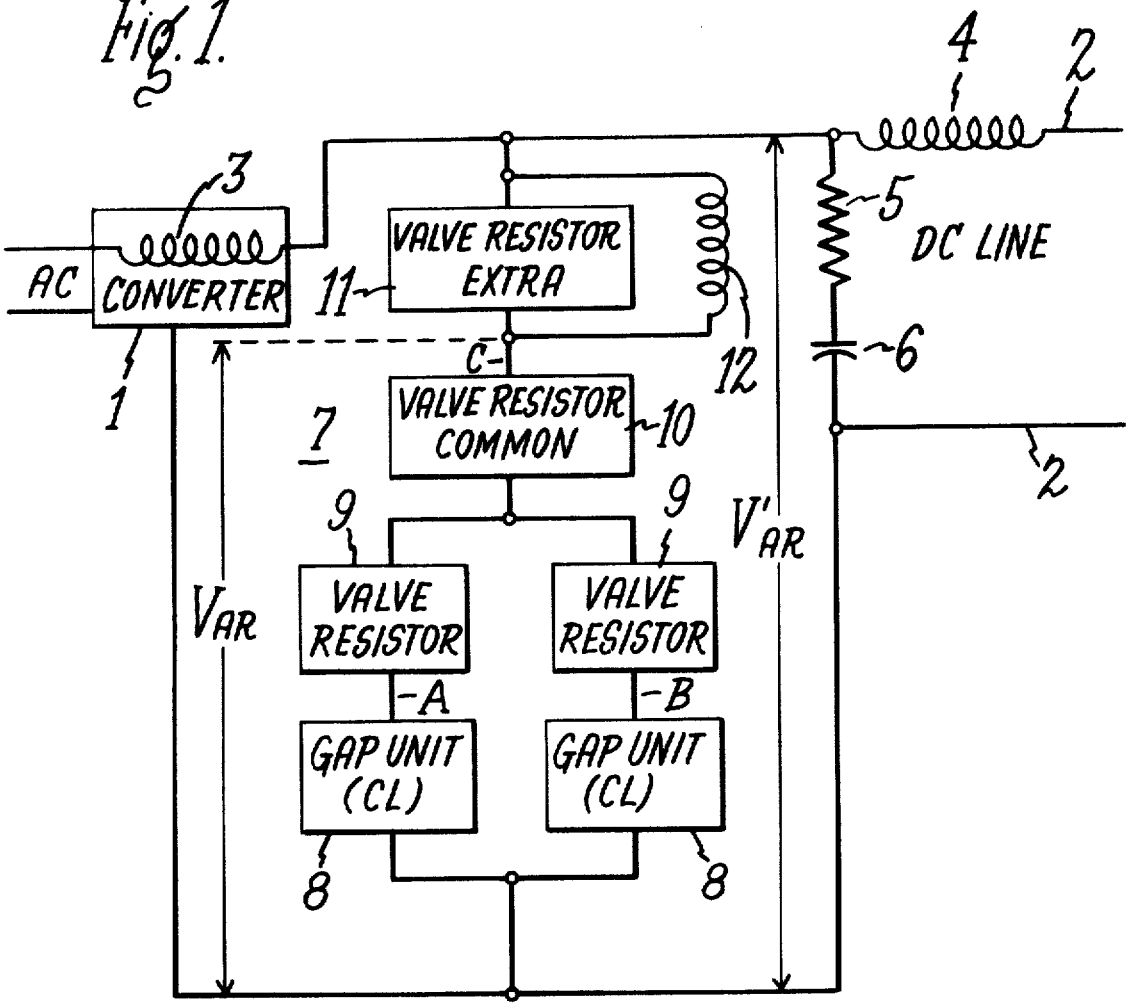

This invention relates to voltage surge diverters and more particularly to improvements in valve type lightning arresters with a current limiting main spark gap or gaps.

Literally, a lightning arrester is a species of voltage surge diverter particularly adapted to divert lightning surges. However, in so-called EHV (extra high voltage) power systems switching surges impose as severe, if not more severe, protective duty on lightning arresters as do lightning surges. Consequently, the term lightning arrester as used herein is not limited to a device for protecting against lightning surges only, but on the contrary is used practically synonymously with the generic term voltage surge diverter.

A valve type lightning arrester comprises essentially at least one valve resistor and at least one spark gap in series. A valve resistor has a negative resistance-current characteristic which gives it a nonlinear volt-ampere characteristic. A current limiting gap is a gap which after sparkover has a rising voltage which, in a time which is long in comparison with the time required for an ordinary impulse surge, such as lightning to subside to half crest value, but which is short in comparison with the time required for an ordinary switching surge to subside to half crest value, attains a voltage value comparable to its sparkover voltage.

Ordinarily, it is desirable to use less valve resistance with a current limiting gap than with a conventional or noncurrent limiting gap in order to limit the arrester voltage during discharge, the latter voltage being the sum of the valve and gap voltages. However, as a result of this lower valve resistance, current limiting gap arresters in operation produce what in some applications are undesirably large voltage transients at the instant of sparkover. Simply adding valve resistance is not a satisfactory way to reduce these transients because it produces an objectionable increase in arrester voltage or protective level during the discharge period.

Heretofore, as a solution of this problem it has been suggested to use time delay or slow shunting means for extra valve resistance, such shunting means being specifically in the form of a special magnetic blow out gap with auxiliary insulated electrodes in the path of the blown out arc.

In accordance with this invention, the problem is solved better by the use of a predetermined amount of inductance shunting extra valve resistance.

An object of the invention is to provide a new and improved voltage surge diverter.

Another object of the invention is to provide a new and improved means for reducing voltage transients produced by lightning arresters with current limiting gaps.

The invention will be better understood from the following description taken in connection with the accompanying drawng and its scope will be pointed out in the appended claims.

In the drawing:

FIG. 1 is a schematic circuit diagram of an application of a presently preferred embodiment of the invention, and FIG. 2 is a set of arrester voltage versus time and a set of arrester current versus time curves or graphs for explaining the operation of the invention.

Referring now to the drawing and more particularly to FIG. 1, there is shown therein a portion of a high voltage direct current power system comprising a converter 1 which may be either a rectifier or an inverter whose A–C side is connected to a conventional commercial frequency power system and whose D–C side is connected to a high voltage D–C transmission line 2. It will be understood that the converter conventionally comprises a plurality of ionic valves and a transformer or transformers having effective series reactance represented symbolically for the coil 3. The line 2 also has a series smoothing reactor 4 and a so-called shunt damper circuit comprising a resistor 5 and a capacitor 6. Primarily for protecting the converter valves and transformers, a lightning arrester 7 is connected across the D–C side of the converter. The arrester 7 comprises parallel legs A and B and a common leg C. The legs A and B each comprise a current limiting gap unit 8 and a valve resistor 9 in series, while the common leg C comprises a common valve resistor 10, an extra valve resistor 11 and an inductor or inductance coil 12 shuting the extra valve resistance 11.

In order for the arrester 7 not to produce too low a voltage or too great a transient voltage reduction when one of the gap units 8 is sparked over, it is necessary to have a large amount of valve resistance. This is particularly true in the circuit illustrated in FIG. 1 where the arrester is in effect bound by the inductances 3 and 4 on both sides so that the only immediate source of arrester current after sparkover is the capacitor 6 of the so-called damper circuit and that current is limited severely by the resistor 5. Therefore, in order to maintain arrester voltage during the abnormally low discharge current condition existing immediately after sparkover, there must be an unusually large amount of valve resistance.

Figure 2A:
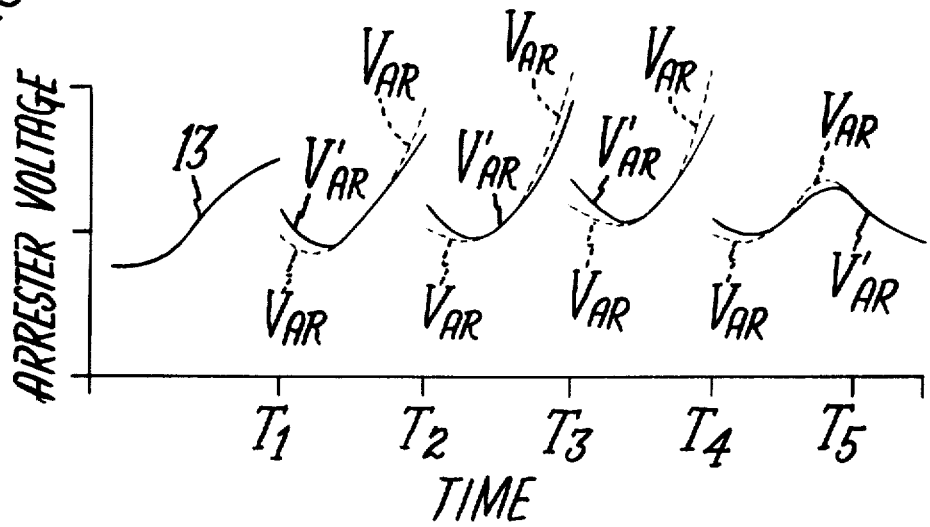
Figure 2B:
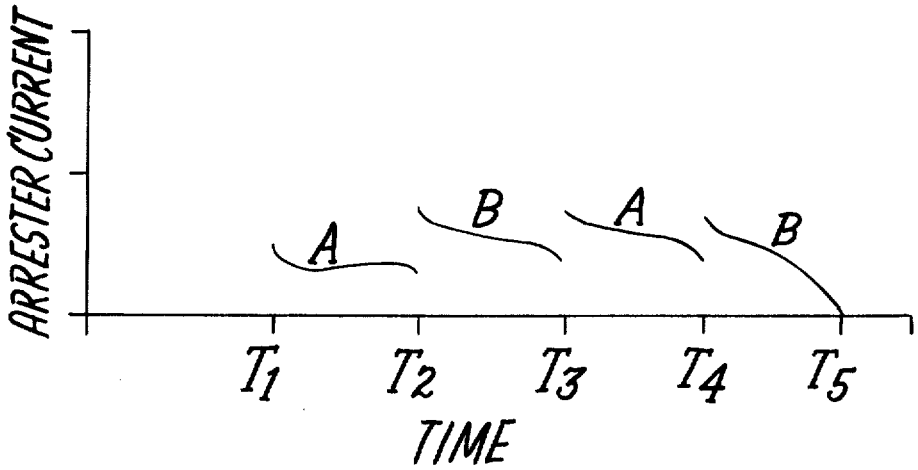

The operation of the invention can best be understood by reference to FIGS. 2a and 2b which are respectively arrester voltage and arrester current curves plotted against the same horizontal time scale.

Referring first to FIG. 2a, the curve 13 represents a voltage surge and shows a steeply rising arrester voltage with time. At time $T_1$, the arrester voltage reaches the sparkover voltage of one of the gaps 8. As it is practically impossible to make two gaps which have identical sparkover voltages, one of the gaps 8 will inherently have a slightly lower sparkover voltage than the other. For example, it will be assumed that the gap 8 in leg A has the lower sparkover voltage so that it sparks over and discharge current starts to flow through leg A and common leg C of the arrester, this current being represented by the curve A in FIG. 2b. The dashed arrester voltage curve $V_{AR}$ in FIG. 2a represents the voltage of an arrester having ordinary amount of valve resistance, i.e., without the extra resistance 11 and of course without its shunt inductance 12. As will be seen, the difference between the end of curve 13 at the pont of sparkover of gap 8 in leg A and the beginning of curve $V_{AR}$ at time $T_1$ represents a substantial transient voltage reduction. The solid curve $V'_{AR}$ is the curve of the voltage of the entire arrester shown in FIG. 1, i.e., the arrester with the extra valve resistor 11 and shunt inductor 12. Immediately after initial sparkover at time $T_1$ and when the current in leg A is changing rapidly the inductance 12 forces most of the arrester current through the extra valve resistor 11 so that the arrester voltage is substantially increased. In the intermediate portion of the current curve of leg A where the current is not changing as rapidly as at the ends, the inductor 12 in effect by-passes the resistor 11 and most of the arrester current flows through the inductor.

At time $T_2$ the voltage of current limiting gap unit 8 has increased to such a value that the voltage of leg A exceeds the sparkover voltage of the current limiting gap unit 8 in leg B and the latter sparks over thus transferring arrester current to leg B as shown by the current curve B after time $T_2$.

An important secondary effect of the inductor 12 is illustrated at the right-hand ends of curves $V_{AR}$ and $V'_{AR}$ between times $T_1$ and $T_2$. In this region because the current in leg A is decreasing due to the build up of voltage in the current limiting gap 8 in leg A the inductor 12 tends to maintain the same current flow and thus actually reverses the current in the extra valve resistor 11 so that in this region the total arrester voltage is decreased. Thus, the combination of extra valve resistor 11 and the inductor 12 is such that the total arrester voltage $V'_{AR}$ does not fall as far immediately after sparkover and does not rise as high immediately before clearing in leg A as would be the case if these elements were not present. The above cycle is then repeated until time $T_5$ when the arrester clears.

The above discussion describes the operation of the arrester in discharging surges originating in either the A-C or D-C systems wherein the surge currents are generally of rather long duration and are limited in magnitude by the impedance of the systems and the inductors 3 and 4. In some applications however, it may be that the arrester can also be subjected to other surges such as perhaps a lightning discharge to the converter terminal. The current available from such surges may be far greater than that available from system generated surges and the so-called IR or resistive voltage drop across the extra valve resistor 11 due to these high currents might cause the total arrester voltage to exceed the desired protective level even before the current limiting gaps have had sufficient time to build a back voltage.

When such high currents are flowing in the arrester the extra valve resistor is not necessary to limit the transient voltage reduction and in fact it is undesirable because of the increased arrester voltage drop as explained above. Thus, it is desirable when the arrester may be subjected to very high current of short duration, to provide a voltage sensitive shunting gap in parallel with the extra valve resistor 11 and shunting coil 12. The sparkover level of such a gap can be easily set so the extra valve resistor is shunted out during the discharge of fast high current surges but is left active in the circuit during the discharge of slower, limited current surges.

The use of such shunting gaps to remove the influence of extra valve resistors during the discharge of high current surges is a separate invention which is not claimed herein. The use of the shunting inductor serves an entirely different purpose in that it removes the influence of the extra valve material in a controlled slow manner independent of the magnitude of the discharge current.

While the invention has been shown and described in relation to an arrester having a so-called flip-flop mode of operation between two parallel legs, it should be understood that the invention is not so limited and that either leg A or leg B may be omitted so that the arrester is a conventional current limiting arrester. The flip-flop principle is an entirely separate invention which per se is disclaimed herein. Its general purpose is to increase the switching surge energy dissipating or absorbing capacity of an arrester by having two or more parallel gaps alternately carrying the discharge current so that they are prevented from overheating by having to carry the heavy discharge current continuously for too long a period of time. The intermittent or flip-flop operation permits each set of current limiting gap to cool while the other gaps are carrying the discharge current.

Current limiting gaps are per se also well known in the art and are described, for example, in United States Pat. No. 3,320,482 granted May 16, 1967 on an application of Eugene C. Sakshaug et al. and assigned to the present assignee.

Although the foregoing description has been limited to particular embodiments of the invention, it will be obvious to those skilled in the art that changes and modifications may be made without departing from the invention, and therefore it is intended by the appended claims to cover all such changes and modifications that fall within the true spirit and scope of the invention.

What we claim as new and desire to secure by Letters Patent of the United States is:

1. In a valve type current limiting gap lightning arrester having at least one current limiting sparkgap electrically connected in series with at least one valve resistance, extra series valve resistance electrically connected in series with said at least one valve resistance, and inductive means connected in shunting relationship with said extra valve resistance, whereby said arrester is adapted for protecting serially connected electronic valve converters in high voltage direct current power systems, said extra valve resistance being operable when the arrester is connected to protect such a system to prevent the development of an undesirably high arrester voltage transient while discharging over-voltage surges from the protected system through the arrester, and said inductive means having an ohmic value, substantially higher than said extra valve resistance at frequencies corresponding to the front of an over-voltage surge and substantially lower than said extra valve resistance at frequencies corresponding to the main portion of an over-voltage surge, thereby to cause the main portion of an over-voltage surge current to be discharged through said inductive means and to force an initial portion of an over-voltage surge current to be discharged primarily through said extra valve resistance.

2. An arrester as defined in claim 1 in which the normal valve resistance is distributed between a set of parallel related circuits and a common circuit in series with said parallel circuits and in which there is a separate current limiting gap in each parallel circuit in series with the valve resistance therein, the extra series valve resistance being extra common valve resistance.

3. An arrester defined in claim 1 in which the normal valve resistance is distributed between a pair of parallel related circuits and a common circuit in series with said parallel circuits and in which there is a separate current limiting gap in each parallel circuit in series with the valve resistance therein, the extra series valve resistance being extra common valve resistance that is at least equal in ohmic value to the normal valve resistance in said common current.

4. In a lightning arrester having a current limiting gap electrically connected in series with a valve resistor to form an over-voltage discharge circuit, the improvement comprising means for substantially reducing the voltage level of said arrester below a level that would normally be developed by said lightning arrester when operated without said means during a predetermined interval when an overvoltage surge current is [initially] *being* discharged through said gap and while the gap voltage is increasing *and the gap current is decreasing*, said means being operatively connected in series with said gap and said series valve resistor.

5. The invention as defined in claim 4 wherein said means comprises an extra valve resistor electrically connected in series with said discharge circuit, and inductive means electrically connected in shunt relation with said extra valve resistor, [and] said means being [found] operable to increase the voltage level of said arrester above a level that would normally be developed by said arrester during a predetermined portion of the [terminating] *initial* end of an over-voltage surge discharged through the arrester.

References Cited

The following references, cited by the Examiner, are of record in the patented file of this patent or the original patent.

UNITED STATES PATENTS

| | | | |
|---|---|---|---|
| 3,019,367 | 1/1962 | Kalb | 315—36 |
| 3,320,482 | 5/1967 | Sakshaug et al. | 317—69 X |
| 3,348,100 | 10/1967 | Kresge | 317—68 X |

JAMES D. TRAMMELL, Primary Examiner

U.S. Cl. X.R.

315—36; 317—70